United States Patent [19]
Bodo et al.

[11] Patent Number: 6,122,239
[45] Date of Patent: Sep. 19, 2000

[54] PRE-MASTERING, ARCHIVAL OPTICAL RECORDER THAT PROVIDES EXTENDED RECORDING TIME

[75] Inventors: Martin J. Bodo, Los Altos Hills; Robert A. Rosenbloom, Santa Cruz; Igor Lokhmotov, San Jose, all of Calif.

[73] Assignee: Computer Performance, Inc., Santa Clara, Calif.

[21] Appl. No.: 09/365,689

[22] Filed: Aug. 2, 1999

Related U.S. Application Data

[60] Provisional application No. 60/095,145, Aug. 3, 1998.

[51] Int. Cl.$^7$ ....................................................... G11B 7/00
[52] U.S. Cl. .................................. 369/59; 369/48; 369/60
[58] Field of Search ................................ 369/59, 60, 42, 369/48, 49, 50, 54, 58, 32

[56] References Cited

U.S. PATENT DOCUMENTS

| | | | |
|---|---|---|---|
| 5,339,203 | 8/1994 | Henits et al. | 360/39 |
| 5,446,603 | 8/1995 | Henits et al. | 360/48 |
| 5,448,420 | 9/1995 | Henits et al. | 360/48 |
| 5,598,391 | 1/1997 | Mukawa | 369/54 |
| 5,625,890 | 4/1997 | Swift | 455/67.1 |
| 5,710,978 | 1/1998 | Swift | 455/67.1 |
| 5,819,005 | 10/1998 | Daly et al. | 395/2.09 |
| 5,831,955 | 11/1998 | Arataki et al. | 369/59 |
| 6,026,068 | 2/2000 | Obata et al. | 369/58 |

*Primary Examiner*—Muhammad Edun
*Attorney, Agent, or Firm*—Donald E. Schreiber

[57] ABSTRACT

A pre-mastering, optical recorder and a logging workstation both receive and condition an analog signal. Both the recorder and the workstation then digitize the conditioned signal storing the digitized data thus obtained in a buffer, preferably either a large RAM or a hard disk. When the digitized data occupies more than a pre-established fraction of the buffer, both the recorder and the workstation further compress the data to recover buffer space thereby permitting recording to continue. The recorder also pre-masters the data for recording onto optical-recording media using an optical-disk recorder included in the recorder. Instead of an optical-disk recorder, the workstation includes a network interface circuit that interfaces the workstation with a network thereby permitting the logger to transmit data via the network for recording either to a pre-mastering, optical recorder, or to a digital logger recorder.

22 Claims, 4 Drawing Sheets

```
L01 00124 REC 00012 L03 00031 L04-00057
DISK 48% CDs 03      WAITING FOR BLANK CD
ACTIVE               INSERT BLANK CD
04 Apr 99 10:36:23 to 05 Apr 99 15:42:38
```

FIG. 6

```
        *** SETUP MENU ***
     OPTIONS
   ▶ SET TIME
     MAINTENANCE
```

FIG. 7

```
        *** OPTIONS MENU ***
     PHONE CALL  START TIMEOUT
   ▶ PHONE CALL  STOP TIMEOUT
     ASSIGN INPUT CHANNEL LABELS
```

FIG. 8

```
   15:42:38 Apr 03 1999
USE > - TO SELECT TIME FIELD,
  ↓ - TO INCREMENT VALUE,
  ↵ - TO SET TIME (24 HR FMT)
```

FIG. 9

```
      *** MAINTENANCE MENU ***
     CLEAR FILES
   ▶ EVENT LOG
     GO BACK TO PREVIOUS MENU...
```

FIG. 10

```
       *** EVENT LOG MENU ***
     SHOW LOG EVENTS
   ▶ CLEAR LOG EVENTS
     GO BACK TO PREVIOUS MENU...
```

PRE-MASTERING, ARCHIVAL OPTICAL RECORDER THAT PROVIDES EXTENDED RECORDING TIME

CLAIM OF PROVISIONAL APPLICATION RIGHTS

This application claims the benefit of U.S. Provisional Patent Application No. 60/095,145 filed on Aug. 3, 1998.

BACKGROUND OF THE INVENTION

1. Field of the Invention

The present invention relates generally to data recording, and more particularly to archival recording of digital data in a readily retrievable compressed format.

2. Description of the Prior Art

There exist circumstances in which audio or low bandwidth data must be recorded together with the time when such recording occurred. Examples of various types of information that are so recorded include telephonic and radio conversations, radar data, facsimiles and modem communications. Such recordings are particularly necessary in police stations, air traffic control facilities, hospitals, prisons, brokerage houses and analogous environments. Systems capable of performing this function have been commercially available for years and are frequently referred to as recording loggers, or just loggers. Initially loggers were based on continuous, real-time analogue magnetic recording which can provide the functionality required for this particular application. However, such analog magnetic logger systems are physically large and require large amounts of space for storing audio tapes used to archive the audio recordings.

To overcome these drawbacks of prior analog loggers, digital loggers, that record onto digital audio tapes ("DATs"), are being used. Although both digital loggers and the DAT on which they record data are physically much smaller than the prior analog recording technology, they exhibit certain drawbacks. One difficulty initially experienced with digital loggers was that the DATs do not provide an efficient time related scheme which permits quickly and reliably retrieving a recording made at a particular time. Another disadvantage was that the prior digital loggers do not efficiently utilize the recording space available on the DATs. Still another disadvantage of prior digital loggers was that the DAT tape decks used with such loggers experience greater wear because they operated whether or not audio is being written.

U.S. Pat. No. 5,448,420 entitled "Method and a System for Storing Audio" that issued Sep. 5, 1995, ("the '420 patent"), discloses a multi input-channel apparatus and method that permits recording audio data on DATs for time-based retrieval. Furthermore, the digital logger disclosed there uses recording space on each DAT more efficiently, and activates the DAT tape deck only while recording. The digital logger first converts each input-channel's audio signal to digital data and then further compresses the data as from 64 k bits/sec/channel to 13 k bits/sec/channel. After the digital data has been compressed, it is stored into a buffer. Subsequently, the digital logger retrieves the data from the buffer and records it onto the DAT. In this way, the buffer matches the digitizing rate of audio processing to the DAT tape deck data transfer rate. Furthermore, data is recorded on the DAT only when the digital logger receives an audio signal, and not during intervals of silence.

To facilitate time-based retrieval of recorded data, the digital logger divides data recorded onto the DAT into a primary partition and secondary partition. The secondary partition is located at the beginning of the DAT. The secondary partition stores times for the beginning and end of data recorded on the DAT and the times and lengths of recording sessions that are read from a clock included in the digital logger. The secondary partition can contain information such as the media format, the manufacturers identification, the product identification by model number of the tape deck that formatted the DAT, the drive vendor, the logic unit type, the logic unit software version, and other similar information. In addition, the secondary partition stores tables to be described that are used in retrieving particular recorded data.

The primary partition includes a plurality of a filemarks. Each filemark is followed by a header and at least one data group, with each data group containing a plurality of audio blocks. Each audio block records audio from an input-channel to the digital logger. Wile the digital logger receives no audio on any input-channel, no header or group is generated and only a plurality of successive filemarks are recorded on the DAT. Each filemark represents a unit of time, as for example six (6) seconds, and each group has an allotted time, as for example approximately one and two-tenths (1.2) seconds. There are, for example, five allotted time periods between filemarks. Space allocation for a group occurs when the digital logger receives an audio signal on the corresponding input-channel during the allotted time interval. Even though each group may not be recorded, each filemark recorded on the DAT still represents six seconds. Each group has a specified number of audio blocks, as for example 32, each audio block representing 1.2 seconds. Thus, if any audio block receives audio from its respective input-channel during the allotted 1.2 seconds, the data group records 1.2 seconds of the audio signal.

Each header recorded on the DAT contains a group map table which specifies a correspondence between the input-channel number and the group number and indicates the presence or absence of audio recorded from particular input-channels. During a recording session, each group map table is written into its respective header. After each recording session, that sessions's group map table data are also written into an accumulated table in the secondary partition located at the beginning of the DAT. Using the digital logger's clock, a recording session's start time is written into the secondary partition as well as the recording session's end time. In this way, the secondary partition accumulates a table representing the group map tables in all headers recorded on the DAT. When retrieving an audio recording from the DAT, the digital logger uses the group map table data recorded in the secondary partition to locate audio blocks recorded from a particular input-channel into a series of data groups.

Although the digital loggers disclosed in the '420 patent has advantages over prior analog loggers, it still has shortcomings in terms of networking expandability and voice capacity. U.S. Pat. No. 5,819,005 entitled "Modular Digital Recording Logger" that issued Oct. 6, 1998, ("the '005 patent"), discloses a digital logger having a basic unit that includes four (4) primary components, an audio card having a plurality of input-channels each of which concurrently communicates with several independent sources such as telephones, a main card that processes audio, a host computer that controls the digital logger's overall operation, and a memory.

In communicating with the audio sources, each audio card receives analog signals and converts them to digital data and forwards the digital data via a time division multiplexed (TDM) bus to the main card. The main card communicates with audio cards through the TDM bus to monitor the status of the audio cards and thereby determine which needs service. The main card also packages data retrieved from the audio cards, executes speech compression and expansion, and performs VOX and other functions. The main card also connects to an Industry Standard Architecture ("ISA") bus as are a micro-processor a LAN adapter and a SCSI adaptor. A computer program executed by the micro-processor supervises and coordinates the activities of the other digital logger components. For recording the compressed digitized audio data, the SCSI adaptor also communicates with at least one DAT tape deck and at least one hard disc drive. Recording audio data stored onto the hard disk permits replaying a desired portion of such data while the digital logger continues recording data both onto the DAT and onto the hard disk.

The digital logger disclosed in the '005 patent is modular so its capacity can be expanded as required readily at a minimum cost and software can be modified conveniently as desired. In addition, the LAN adapter allows each digital logger described in the '005 patent to be part of a networked system that includes other digital loggers and workstations. Workstations connected to the LAN are similar to the digital logger except they omit the SCSI adaptor, DAT tape deck and hard disc drive. As described in the '005 patent, indicates that workstations may only receive compressed digitized audio data from the digital logger via the LAN for replaying at the workstation.

However, despite all of the effort expended thus far in attempting to configure digital loggers to record effectively and conveniently on DAT, economic impediments and operational difficulties still exist. For example, the price for DAT tape decks is two (2) to three (3) times greater than that for archival optical recording technologies such as a write-once compact disk ("CD-R") recorders. Furthermore, when used in digital loggers DAT tape decks exhibit poor reliability, e.g. a 2000 hour mean time between failure ("MTBF"), because of the mechanical complexity required for helical scan magnetic recording used for DAT.

Furthermore, when used in a digital logger the DAT tape deck must either be left running all the time, or be frequently turned on and off. Either of these operating modes is to be contrasted with the operating mode for which DAT tape decks are designed in which the DAT tape deck is turned on and off infrequently, and remains turned on for a comparatively long interval of time, e.g. tens of minutes. Because DAT tape decks are not designed for either of the operating modes which a digital logger must employ, such tape decks exhibit poor reliability when used for that purposes.

In addition to characteristics of DAT tape decks which make them unattractive for audio logging, the formats used for recording digital logger data on DAT such as that as described in the '420 patent and retrieving data so recorded is inefficient and time consuming. While recording data on DAT, the digital logger must accumulate and maintain the data to be subsequently recorded in the secondary partition located at the beginning of the DAT. Periodically, the digital logger must rewind the DAT to the beginning, record the data in the secondary partition, and then return to the end of the recorded data to resume recording.

After data has been recorded onto the DAT, isolating and recovering a particular telephone conversation from the DAT is an arduous process. Retrieving a specific telephone conversation from DAT requires first rewinding the tape to read the secondary partition, and then searching down the tape to listen to audio blocks for a particular input-channel which may or may not contain a desired conversation. If the wrong audio block and or channel has been chosen, listening to other audio blocks for the same or another input-channel requires again rewind the DAT to re-read the secondary partition, and then again searching down the tape to listen to other audio blocks.

In addition to the preceding problems associated with using DAT for digital loggers, under certain circumstances the recording format for telephone conversations logged on DAT using the DAT recording technique described in the '420 patent may impede law enforcement. If in the course of a judicial proceeding a law enforcement agency must produce as evidence a copy of a conversation recorded on DAT using that technique, then the digital data recorded for the input-channel in question will necessarily be intermixed with all other concurrently logged conversations from other input-channels of the digital logger. The intermixing of two or more conversations on a single DAT tape that must be disclosed as part of a judicial proceeding creates a possibility that other concurrently recorded conversations could be exploited to unwarrantedly impede the judicial process.

Furthermore, as has been known for many years, magnetic tape is not considered an archival recording media. Over time, magnetic tape recording media degrades and the information recorded there becomes un-recoverable. Consequently, archival data bases that have been recorded on magnetic tape media must be periodically refreshed by copying data stored on older media onto newer media. For example, commercial manufacturers project only a seven (7) year life for DATs. Conversely, it is known that archival recording media, having a useful life of one-hundred ("100") years, exists for optical recording technologies such as microfilm. Manufacturers of media for newer optical recording technologies such as a CD-R, CD-RW, write-once digital video disk ("DVD-R"), and rewritable digital video disk ("DVD-RW") presently estimate the useful life for such recording media at thirty (30) to thirty-five (35) years to one-hundred (100). However, several technological impediments exist to directly using CD-R, CD-RW, DVD-R and CD-RW technologies in the conventional way for analog data recording applications such as that required for a digital logger.

First, the conventional consumer CD audio recording format can presently preserve only seventy-four (74) minutes of stereo per CD-R or CD-RW. Conversely, audio logging requires a minimum of several input-channel-hours of recording time per day, which makes direct use of conventional CD audio recorders impractical for that application. Furthermore, consumer quality audio CD recorders have a MTBF of approximately one-thousand ("1,000") hours. Consequently, even if the conventional audio CD recording format were somehow inherently capable of recording several input-channel-hours of audio recording per day, the failure of such a recorder approximately every forty (40) days would bar using that technology in digital loggers.

While there exists a "multi-session" recording format for CD-R technology that can be used to record compressed digital data representing an analog signal, each successive recording session consumes approximately 20 Mega-bytes ("MBs") of storage space on the CD-R media. Since CD-R and CD-RW media provide approximately 650 MBs of storage, space occupied on CD-R media for a sequence of approximately thirty-two (32) multi-session recordings completely fills a single CD.

BRIEF SUMMARY OF THE INVENTION

An object of the present invention is to provide an apparatus that receives an analog signal over an extended period of time and records a representation of the analog signal as compressed, digital data on truly archival recording media.

Another object of the present invention is to provide an apparatus which, while preserving an analog signal for recording as compressed digital data on archival media, also permits concurrent retrieval and replaying of the received analog signal.

Another object of the present invention is to permit instantaneously replaying an analog signal that has been previously recorded on archival media as compressed digital data.

Another object of the present invention is to provide a digital logger that can record at least twenty (20) input-channel-hours of analog voice data onto CD-R or CD-RW media in a readily retrievable and reproducible digital data recording format.

Another object of the present invention is to provide an apparatus which permits recording as compressed digital data analog signals that have an indeterminate duration by progressively increasing the input-channel-hours of the analog signals recorded as the compressed digital data even if the quality of an analog signal that may be reproduced from the recorded compressed digital data degrades.

Another object of the present invention is to provide a system for recording analog signals as compressed digital data which permits rapidly and accurately transmitting and duplicating the recorded compressed digital data.

Another object of the present invention is to record an analog signal as compressed digital data in a format that is compatible with standard personal computer systems so such recordings can be readily transmitted to a distant location for replaying using conventional digital communication protocols, networks and systems.

Another object of the invention is to provide a robust, redundant apparatus for recording an analog signal received over an extended period of time as compressed, digital data on truly archival media even if the device for recording on the archival media becomes temporarily unavailable.

Briefly, the present invention in one embodiment is a pre-mastering, optical recorder that includes an input-signal conditioning-circuit for electronically conditioning an analog signal received by an input-channel thereof. The pre-mastering, optical recorder also includes a coder and decoder ("CODEC") that is coupled to the input-signal conditioning-circuit for receiving the conditioned analog signal therefrom, and for converting the conditioned analog signal into digital data. The pre-mastering, optical recorder also includes a random access memory ("RAM") that is coupled to the CODEC for receiving and temporarily storing digital data produced by the CODEC. A buffer, also included in the pre-mastering, optical recorder receives from the RAM and semi-permanently stores the digital data. The pre-mastering, optical recorder also includes an optical-disk recorder that is coupled to the RAM and that is adapted for recording pre-mastered digital data onto optical-recording media.

A central processing unit ("CPU") also included in the pre-mastering, optical recorder is coupled to the CODEC, the RAM, the buffer, and the optical-disk recorder. The CPU executes a digital computer program that:

1. supervises operation of the pre-mastering, optical recorder for:
   a. transferring from the CODEC to the RAM digital data produced by the CODEC responsive to the presence of the analog signal on the input-channel of the pre-mastering, optical recorder; and
   b. subsequently transferring the digital data from the RAM to the buffer for semi-permanently recording the digital data therein;
2. periodically retrieves from the buffer digital data that has been semi-permanently recorded therein, processes the retrieved digital data to prepare pre-mastered digital data in a format that permits recording at least twenty (20) input-channel-hours of the analog signal received by the input-signal conditioning-circuit onto optical-recording media; and
3. transfers to the optical-disk recorder the pre-mastered digital data for recording the pre-mastered digital data onto optical-recording media then present in the optical-disk recorder.

The present invention in another embodiment is a logging workstation that is adapted for inclusion in a network that includes at least a digital logger recorder. Similar to the pre-mastering, optical recorder, the logging workstation includes the input-signal conditioning-circuit, the CODEC, the RAM, the buffer, and the CPU. Differing from the pre-mastering, optical recorder, the logging workstation omits the optical-disk recorder and always includes a network interface circuit that is coupled to the RAM, and which interfaces the logging workstation with a network. Thus, the network interface circuit permits the logging workstation to communicate electronically with other workstations and with the digital logger recorder that are also coupled to the network. In the logging workstation the CPU executes a digital computer program that:

1. supervises operation of the logging workstation for:
   a. transferring from the CODEC to the RAM digital data produced by the CODEC responsive to the presence of the analog signal on the input-channel of the logging workstation; and
   b. subsequently transferring the digital data from the RAM to the buffer for semi-permanently recording the digital data therein;
2. periodically retrieves from the buffer digital data that has been semi-permanently recorded therein, processes the retrieved digital data to prepare compressed digital data therefrom to be recorded to the buffer to replace the retrieved digital data; and
3. periodically transmits digital data via the network interface circuit from the buffer to the network for receipt by the digital logger recorder coupled to the network.

These and other features, objects and advantages will be understood or apparent to those of ordinary skill in the art from the following detailed description of the preferred embodiment as illustrated in the various drawing figures.

DETAILED DESCRIPTION

Figure 1:
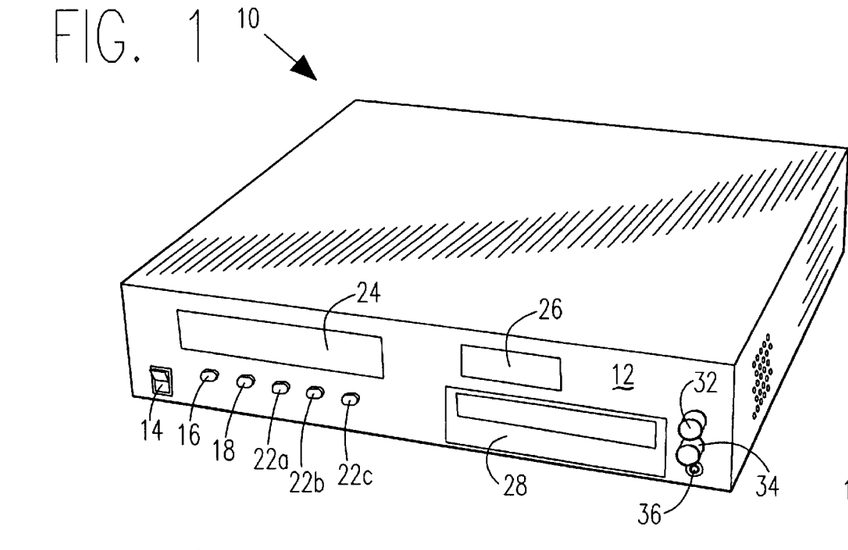
FIG. 1 is a perspective view depicting a pre-mastering, archival optical recorder in accordance with the present invention specifically adapted for use as a digital logger.

FIG. 1 depicts a pre-mastering, archival optical recorder specifically adapted for use as a digital logger that is referred to by the general reference character 10. The digital logger 10 includes a front panel 12 on which is mounted an on/off switch 14 for turning the digital logger 10 on and off. The front panel 12 is also pierced by a plurality of push-buttons that include a start/stop button 16, a hot-burn button 18, and three (3) menu-navigation buttons 22a–22c. The menu-navigation buttons 22a–22c permit an operator of the digital logger 10 to select a particular item from an operating menu the digital logger 10 presents for operator viewing on a four (4) line, forty (40) column liquid crystal display ("LCD") 24 included in the front panel 12. The front panel 12 also includes a light emitting diode ("LED") VU meter 26 that concurrently displays the recording level of analog signals received by each of four (4) input-channels of the digital logger 10. The recording level, as indicated on the VU meter 26 must be accurately monitored and automatically controlled to take full advantage of audio compression while avoiding unwanted distortion. An optical-disk recorder 28 which may be chosen to permit recording data on CD-R, CD-RW, DVD-R or DVD-RW media, or on any other analogous optical-recording media, extends through the front panel 12 immediately beneath the VU meter 26.

A rotary input-channel selector-switch 32, projecting through the front panel 12, permits selecting one (1) of four (4) input-channels of the digital logger 10 for monitoring during recording thereof. A rotary replay volume-control 34 projects from the front panel 12 immediately beneath the input-channel selector-switch 32. The replay volume-control 34 permits an operator to adjust the amplitude of an output signal supplied to a headphone jack 36 while replaying data recorded for the input-channel selected by the input-channel selector-switch 32. The headphone jack 36 is located on the front panel 12 immediately beneath the replay volume-control 34.

Figure 2:
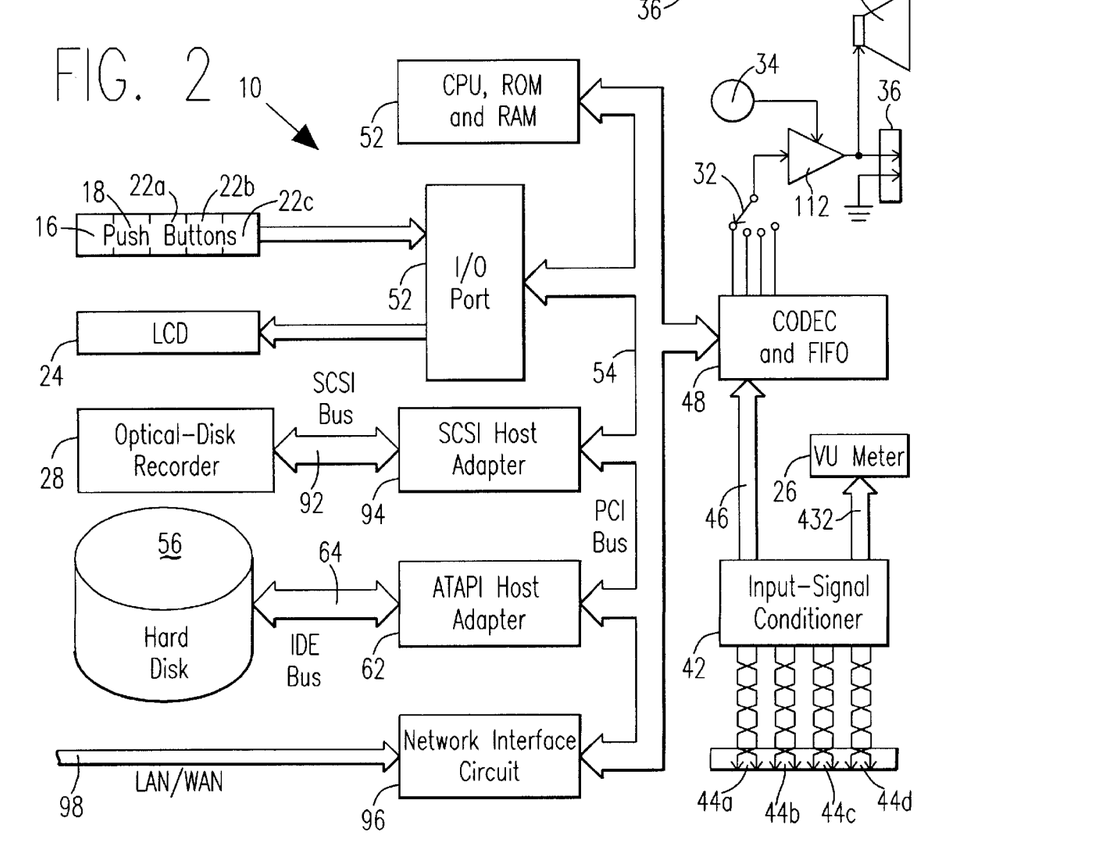
FIG. 2 is a block diagram for the digital logger illustrated in FIG. 1.

The block diagram of FIG. 2 depicts the preferred embodiment of the digital logger 10 illustrated in FIG. 1. As illustrated in FIG. 2, the digital logger 10 includes an input-signal conditioner circuit 42 that concurrently receives up to four (4) analog signals, such as telephone signals, respectively from four (4) input-channel jacks 44a–44d included in the digital logger 10. As explained in greater detail below in connection with FIG. 5, the input-signal conditioner circuit 42 electronically conditions analog signals received by each input-channel of the digital logger to produce four (4) conditioned analog signals, each of which is individually adapted for conversion into digital data.

The input-signal conditioner circuit 42 supplies the conditioned analog signals via a conditioned-analog-signal bus 46 to inputs of a coder and decoder ("CODEC") and a first-in first-out ("FIFO") circuit 48 also included in the digital logger 10. Each of four (4) CODECs included in the CODEC and FIFO circuit 48 respectively converts into digital data one (1) of the conditioned analog signals received from the input-signal conditioner circuit 42. In converting the conditioned analog signals into digital data, each CODEC preferably applies $\mu$Law compression to the conditioned analog signal. The use of $\mu$Law compression effectively amplifies weak analog signals and attenuates strong analog signals thus reducing the volume range present in the compressed digital data generated by the CODEC from the conditioned analog signal.

The digital logger 10 also includes a central processing unit ("CPU"), read only memory (ROM) and random access memory ("RAM") circuit 52. The CPU included in the CPU, ROM and RAM circuit 52 is preferably a 186 series microprocessor manufactured by Advanced Micro Devices, Inc. ("AMD") of Sunnyvale, Calif. that operates at a 50 MHz, or preferably a 100 MHz, clock cycle. The ROM included in the CPU, ROM and RAM circuit 52 preferably provides at least 256 Kilo-bytes ("KBs") of storage for power-on self-test ("POST"), a "boot" computer programs executed by the CPU, and a program which permits upgrading the computer program executed by the CPU from a CD-ROM present in the optical-disk recorder 28. The RAM included in the CPU, ROM and RAM circuit 52 preferably provides at least 1.0 MB of storage that is used for storing the computer program executed by the CPU and data required for operation of the digital logger 10.

A processor bus 54, which preferably is a Peripheral Component Interconnect ("PCI") bus, couples the CPU, ROM and RAM circuit 52 to the CODEC and FIFO circuit 48. While the digital logger 10 operates, a computer program executed by the CPU operating under a real-time operating system periodically retrieves from each of four (4) FIFOs included in the CODEC and FIFO circuit 48 the $\mu$Law compressed digital data generated by an associated CODEC and stores the retrieved digital data into the RAM. After the computer program's execution stores the $\mu$Law compressed digital data into the RAM, the computer program then records the $\mu$Law compressed digital data into a buffer provided by a read-write direct access storage device such as a forty-seven (47) giga-byte ("GB") hard disk 56 included in the digital logger 10. To permit recording the digital data on the hard disk 56, the digital logger 10 includes an ATAPI host adapter 62 that is coupled to the processor bus 54 for communicating with the CPU, ROM and RAM circuit 52.

The ATAPI host adapter 62 is also coupled by an Integrated Drive Electronics ("IDE") bus 64 to the hard disk 56. In addition to storing compressed digital data recorded by the digital logger 10, the hard disk 56 also stores the computer program executed by the CPU included in the CPU, ROM and RAM circuit 52.

In recording the µLaw compressed digital data onto the hard disk 56, the computer program executed by the CPU writes such data into separate files each of which stores data for only a single telephone conversation. In storing data into a file the computer program opens the file with append only access rights. By opening the file with append only access rights the computer program leaves the file in a state in which it may be read by other computer programs executed concurrently by the CPU operating under the control of the real-time operating system. Consequently, while one computer program stores µLaw compressed digital data for a particular telephone conversation into a file on the hard disk 56 another concurrently executing computer program may be reading and replaying data from same file.

After recorded µLaw compressed digital data occupies a pre-established amount of storage space on the hard disk 56, e.g. 90% of the available forty-seven (47) GB, the real-time operating system automatically starts executing a first background computer program to further compress files that contain digital data for telephone conversations previously recorded with only µLaw compression. This first stage of an incremental digital data compression process converts digital data for entire telephone conversations from µLaw compression to adaptive pulse code modulation ("ADPCM") compression. Conversion of telephone conversations to ADPCM compressed digital data frees space on the hard disk 56 thereby permitting direct recording of µLaw compressed digital data for the most recently received telephone conversations to continue. After execution of the first background computer program frees a sufficient space on the hard disk 56, or after all previously recorded µLaw compressed telephone conversations have been converted to ADPCM compression, operation of the background computer program terminates.

If the most recently recorded µLaw compressed digital data together with the ADPCM compressed digital data occupy a pre-established amount of storage space on the hard disk 56, e.g. 70% of the available forty-seven (47) GB, the real-time operating system automatically starts execution of a second background computer program to even further compress files that contain digital data for telephone conversations previously recorded as ADPCM compressed data. This second stage of incremental compression converts files of ADPCM compressed digital data into files containing digital data compressed in accordance with a G.723 standard. Conversion of telephone conversations to G.723 compressed digital data again frees space on the hard disk 56 thereby permitting continued recording of µLaw compressed digital data for the most recently received telephone conversations.

The pre-established thresholds for commencing conversion of digital data from µLaw compression to ADPCM compressed digital data, and subsequently from ADPCM compression to G.723 compressed digital data are determined mathematically based upon the amount of space recovered by, and the amount of time required for, further compressing the data. Since compression in accordance with the G.723 standard requires supplying parameters that specify the degree of compression, compression of digital data in accordance with the G.723 standard may be adjusted to reduce the amount of data as much as fifteen-to-one (15:1) in comparison with the µLaw compressed digital data. In compressing the digital data, the computer program executed by the CPU changes the file name from *.AU to *.ADP after data in a file undergoes ADPCM compression, from *.ADP to *.723 after data in a file undergoes G.723 compression, and from *.723 to *.728 if a file were to be even further compressed in accordance with the G.728 standard, i.e. in accordance with the CELP standard.

As is well known to those skilled in the art, compression of digital data in accordance with the G.723 standard is lossy, i.e. G.723 compression discards data that is less important for psycho-acoustic comprehension of decompressed audio while preserving the more psycho-acoustically significant data. Consequently, as the second background computer program increases the compression of digital data using G.723 compression, the quality of an audio signal that may be reproduced from the G.723 compressed digital data decreases. Practical experience indicates that, in general, an audio signal reproduced from digital data compressed more than six-to-one (6:1) in comparison with the µLaw compressed digital data provides less satisfactory audio quality.

Figure 3:
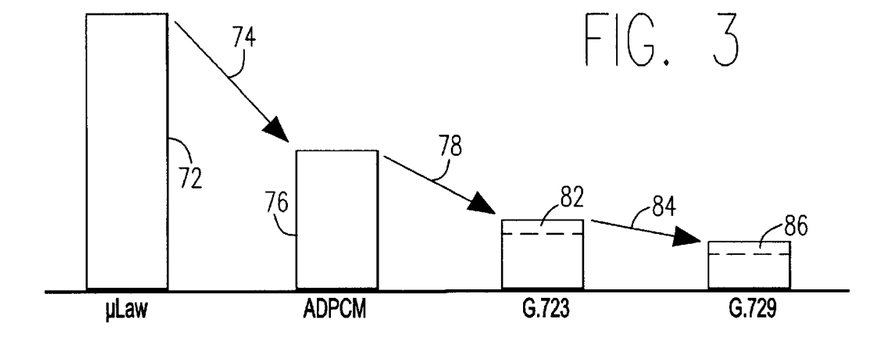
FIG. 3 is a bar chart which graphically illustrates how compression of digital data reduces storage requirements.

The bar chart of FIG. 3 illustrates graphically how the digital computer program by further compressing the µLaw compressed digital data reduces the amount of storage required for a particular amount of data. In the illustration of FIG. 3, a bar 72 represents a quantity of µLaw compressed data which the computer program executed by the CPU transfers from the CODEC and FIFO circuit 48 to the RAM, for example µLaw compressed data for an entire telephone conversation received by the input-signal conditioner circuit 42 via one of the input-channels of the digital logger 10. After the first background computer program retrieves the µLaw compressed data represented by the bar 72 from the hard disk 56, as indicated by an arrow 74 in FIG. 3, the digital data is further compressed by converting it into the ADPCM format. After conversion to the ADPCM format, the quantity of compressed digital data is that represented by a bar 76 in FIG. 3. After the digital data has been compressed into the ADPCM format, the second background computer program computer program once again further compresses the digital data in accordance with a G.723 standard as indicated in FIG. 3 by an arrow 78. After compression in accordance with the G.723 standard to an extent which permits replaying the G.723 compressed data with acceptable audio quality the quantity of digital data is that illustrated in FIG. 3 by a bar 82.

In comparison with the conventional consumer audio CD recording format for which a single CD stores up to seventy-four (74) minutes of stereo, a CD-R or CD-RW is capable of storing approximately one-thousand two-hundred and sixty (1,260) minutes, i.e. twenty-one (1) input-channel-hours, of monaural µLaw compressed digital data. The further compression of the digital data from µLaw compression to ADPCM compression reduces by approximately one-half (½) the quantity of compressed digital data required for recording a particular telephone conversation. Yet further compression of the digital data from the ADPCM format to the G.723 format to the extent depicted in FIG. 3 again reduces by approximately one-half (½) the amount of compressed digital data required for recording the telephone conversation. Accordingly, after G.723 compression the of ADPCM compressed digital data required for recording the telephone conversation is approximately one-quarter (¼) to one-fifth (⅕) of the µLaw compressed digital data for the telephone conversation. The presently preferred forty-seven (47) GB hard disk 56 can store approximately six-thousand five-hundred (6,500) input-channel-hours of audio data compressed in accordance with the G.723 standard.

While not implemented in the presently preferred embodiment of the digital logger 10, G.723 compressed digital data can be yet further compressed in accordance with a G.728 standard as indicated in FIG. 3 by an arrow 84. The further compression of the digital data in accordance with the G.728 standard reduces the total amount of compressed digital data to a quantity represented in FIG. 3 by a bar 86 which is approximately one-sixth (⅙) to one-eighth (⅛) of that required for the μLaw compressed digital data. Compression of digital data in accordance with the G.728 standard for storage onto the hard disk 56 is presently not preferred for the digital logger 10 because processing required to further compress the data from the G.723 format to the G.728 format overloads the presently preferred CPU, but could possibly increase the amount of data which the forty-seven (47) GB hard disk 56 may store from six-thousand five-hundred (6,500) input-channel-hours to no more than thirteen-thousand (13,000) input-channel-hours. However, if the CPU included in the digital logger 10 provided performance adequate to allow further compressing the digital data in accordance with the G.728 specification, then the amount of data stored on the hard disk 56 could be increased by employing such further compression.

In addition to the hard disk 56, the digital logger 10 also permits recording compressed digital data on archival optical-recording media using the optical-disk recorder 28 illustrated in FIGS. 1 and 2. To permit transferring compressed digital data to the optical-disk recorder 28, the digital logger 10 includes a Small Computer System Interface ("SCSI") bus 92 that couples the optical-disk recorder 28 to a SCSI host adapter 94. The SCSI host adapter 94 also couples to the processor bus 54 for communicating with the CPU, ROM and RAM circuit 52. Whenever the digital logger 10 completes accumulating approximately twenty-one (21) input-channel-hours of G.723 compressed digital data on the hard disk 56, upon detecting that condition the computer program automatically commences recording the most recently received data onto CD-R, CD-RW, DVD-R or DVD-RW archival optical-recording media then present in the optical-disk recorder 28.

In principal the computer program executed by the CPU, ROM and RAM circuit 52 could record digital data compressed from the analog signals received by the input-signal conditioner circuit 42 via the input-channel jacks 44a–44d onto archival optical-recording media using any of the compressed data formats described above. That is, compressed data could be recorded onto such archival optical-recording media either as μLaw compressed digital data, as ADPCM compressed digital data, as G.723 compressed digital data, or as G.728 compressed digital data. However, for ease of replaying compressed digital data after it has been recorded onto archival optical-recording media, the digital logger 10 preferably records such digital data using the μLaw compression format. Digital data recorded onto archival optical-recording media in the μLaw compression format in the way described below may be readily replayed on a personal computer that includes a sound generation system which is compatible with the SoundBlasters® audio boards marketed by Creative Technology Ltd. of Singapore. For example, individual telephone conversations recorded in this format may be readily replayed using any personal computer that includes a SoundBlaster compatible sound generation system and that has the Microsoft Corporation's Windows Media Player computer program installed thereon.

Before starting to record μLaw compressed digital data onto archival optical-recording media using the optical-disk recorder 28, the computer program executed by the CPU prepares a pre-master of the data to be recorded, and during preparation of the pre-mastered data temporarily stores the pre-mastered data on the hard disk 56. In pre-mastering compressed digital data for archival recording by the optical-disk recorder 28, the computer program executed by the CPU reverses the data compression process described above by successively decompressing compressed digital data for individual telephone conversation that have been previously recorded on the hard disk 56 after compression in accordance with the G.723 standard. Decompressing the digital data compressed in accordance with the G.723 standard produces ADPCM compressed digital data. After having obtained ADPCM compressed digital data for a telephone conversation, the computer program executed by the CPU then further decompresses the ADPCM compressed digital data into μLaw compressed digital data. However, because compression from the ADPCM compressed digital data into digital data compressed in accordance with the G.723 standard is lossy, the μLaw compressed digital data generated during pre-mastering of compressed digital data for recording on archival optical-recording media using the optical-disk recorder 28 almost always differs from and has lower audio quality than the corresponding μLaw compressed digital data which was initially transferred from the CODEC and FIFO circuit 48 to the RAM of the CPU, ROM and RAM circuit 52.

The pre-mastered compressed digital data prepared in this way by the digital logger 10 consists of a set of files each one of which contains digital data for a single telephone conversation received by the input-signal conditioner circuit 42 via one of the input-channel jack 44a, 44b, or 44d. The files containing the μLaw compressed data for each input-channel are assigned to directories before being recorded onto the archival optical-recording media. As indicated in TABLE 1 set forth below, the highest level of the directory tree structure for the pre-mastered data specifies separate directories for each input-channel of the digital logger 10. Within each input-channel's directory, subdirectories are created for each day for which data will be recorded onto the archival optical-recording media for that input-channel. The name assigned to each file indicates the time at which the digital logger 10 began recording the telephone conversation. During pre-mastering, the filenames assigned to the digital data for each telephone conversation are sorted in ascending order so each successive file has name greater than the previous one thereby complying with the International Organization for Standardisation ("ISO") ISO-9660 interchange level 1 (MS-DOS compatible) specification.

TABLE 1

| CHANNEL 1 | CHANNEL 2 | CHANNEL 3 | CHANNEL 4 |
|---|---|---|---|
| 19980601 | 19980601 | 19980601 | 19980601 |
| 212450.AU | 233742.AU | 224307.AU | 205015.AU |
| 225212.AU | 19980602 | 231827.AU | 19980602 |
| 19980602 | 005023.AU | 235218.AU | 010709.AU |
| 002357.AU | 022305.AU | 19980602 | 015023.AU |
| 011506.AU | 025048.AU | 003224.AU | 022357.AU |
| 032536.AU | 031706.AU | 010746.AU | 024753.AU |
|  | 034527.AU |  | 030623.AU |
|  |  |  | 034702.AU |

The illustrative example set forth above depicts pre-mastering of compressed digital data by the digital logger 10 for recording onto archival optical-recording media of telephone conversations received on all four (4) input-channels some on Jun. 1, 1998, and others on Jun. 2, 1998. For channel 1 on Jun. 1, 1998, the digital logger 10 pre-mastered compressed digital data for recording onto archival optical-recording media telephone conversations which began respectively at 9:24:50 p.m. and at 10:52:12 p.m. For channel 4 on Jun. 2, 1998, the digital logger 10 pre-mastered compressed digital data for recording onto archival optical-recording media telephone conversations which began respectively at 1:7:9 a.m., 1:50:23 a.m., 2:23:57 a.m. 2:47:53 a.m., 3:6:23 a.m., and 3:47:2 a.m.

Because all of the filenames assigned in recording the compressed digital data onto archival optical-recording media include the file name extension "AU," replaying such a file with a personal computer that includes a SoundBlaster compatible sound generation system, that operates under Microsoft Corporation's Windows 95, 98 or NT operating system, and that has the Microsoft Corporation's Media Player computer program installed thereon requires only "clicking" with a pointing device on the filename. Upon selecting with a pointing device a file whose name includes the AU extension, the Microsoft Corporation's operating system immediately begins executing the Media Player computer program to process the designated file thereby causing the $\mu$Law compressed digital data stored in the file to be replayed instantaneously.

After the computer program executed by the CPU completes pre-mastering the compressed digital data for recording onto the archival optical-recording media, it them copies the pre-mastered compressed digital data from the hard disk 56 to the optical-disk recorder 28. A significant characteristic of the digital logger 10 which ensures successful copying of the pre-mastered compressed digital data from the hard disk 56 to the optical-disk recorder 28 is the use of the separate ATAPI host adapter 62 and SCSI host adapter 94. The use of the separate ATAPI host adapter 62 and SCSI host adapter 94 permits respectively retrieving pre-mastered compressed digital data from the hard disk 56 while concurrently continuing to record telephone conversations that are being received by the input-signal conditioner circuit 42 and while transmitting the pre-mastered compressed digital data to the optical-disk recorder 28. The use of the separate ATAPI host adapter 62 and SCSI host adapter 94 greatly reduces the likelihood that a momentary delay in retrieving data from the hard disk 56 could possibly interfere with timely receipt of data by the optical-disk recorder 28 for recording onto the archival optical-recording media.

After the computer program executed by the CPU completes copying the pre-mastered compressed digital data from the hard disk 56 to the optical-disk recorder 28, the computer program may be enabled to automatically extend from the front panel 12 a tray of the optical-disk recorder 28 which carries the then recorded archival optical-recording media. Extending the tray of the optical-disk recorder 28 informs an operator of the digital logger 10 that the pre-mastered compressed digital data has been recorded on the archival optical-recording media. Automatically extending the tray of the optical-disk recorder 28 also alerts the operator to prepare the digital logger 10 for the next archival optical recording session by replacing the recorded media with fresh, blank archival optical-recording media.

As will be readily apparent to those skilled in the art, in time the space available for recording telephone conversations on the hard disk 56 will become completely occupied by digital data compressed in accordance with the G.723 standard to the maximum extent practicable after recording approximately six-thousand five-hundred (6,500) input-channel-hours of telephone conversations received by the input-signal conditioner circuit 42. When that condition occurs, the computer program executed by the CPU may be enabled to recover space on the hard disk 56 for recording future telephone conversations by deleting files which contain the oldest recorded telephone conversations.

As illustrated in FIG. 2, the digital logger 10 may also include a network interface circuit 96 which interfaces the digital logger 10 with a local area network ("LAN") or wide area network ("WAN") 98. As indicated graphically in FIG. 4, inclusion of the network interface circuit 96 permits the digital logger 10 to communicate electronically with other workstations 102 or digital loggers 10 that are also connected to the LAN/WAN 98. The specific characteristics of the network interface circuit 96 are determined to a significant extent by the characteristics of the LAN/WAN 98. For example, if the LAN/WAN 98 is an Ethernet® or 10 Base-T local area network, the network interface circuit 96 would be a suitable network interface card ("NIC"). However, if the LAN/WAN 98 is the Internet then the network interface circuit 96 would likely be a serial port and a modem, or some other suitable circuit, for communicating with an internet service provider ("ISP"). In extraordinary circumstances, the network interface circuit 96 could even permit a direct point of presence ("POP") connection to the Internet backbone.

The real-time operating system included in the digital logger 10 includes a TCP/IP stack, i.e. RT-IP, which is a public domain source code that is used both in BSD Unix and Linux. Accordingly, the digital logger 10 includes software that permits communicating using the TCP/IP protocol via the Internet, and over LANs such as Ethernet or 10 Base-T.

Figure 4:
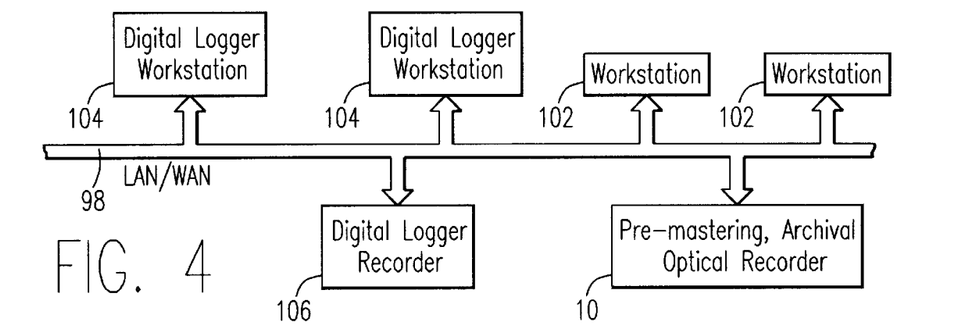
FIG. 4 is a block diagram depicting a network that includes the pre-mastering, archival optical recorder illustrated in FIGS. 1 and 2 together with workstations, logging workstations, and a digital logger recorder.

Using either LAN or WAN communication, individuals who have been authorized to access a recording of a specific telephone conversation may retrieve it from the digital logger 10 for replaying at workstations 102 located remotely from the digital logger 10. The digital logger 10 transmits the file containing a specific telephone conversation to the requesting workstation 102 in the compression format in which the file is presently stored on the hard disk 56. Accordingly, depending upon the degree to which the telephone conversation has been compressed the workstation 102 may have to decompress the file from G.723 format to ADCPM format, and then further decompress the file from ADCPM format to $\mu$Law format before the telephone conversation may be replayed.

Addition of LAN and/or WAN communication to the digital logger 10 also permits locating the optical-disk recorder 28 remotely from the remainder of the digital logger 10. Locating the optical-disk recorder 28 remotely from the remainder of the digital logger 10 permits an organization which has offices distributed over a wide geographic region, e.g. a financial institution such as a stock brokerage firm, and which desires to record telephone conversations received at individual offices to install a digital logger 10 at one location and logging workstations 104 in each office as illustrated in FIG. 4. The logging workstations 104 are preferably configured identically to the digital logger 10 illustrated in FIG. 2 that includes the network interface circuit 96 while omitting the optical-disk recorder 28, the SCSI host adapter 94, and any buttons 16, 18 or 22a–22c which are required solely for operation of the optical-disk recorder 28.

In such a networked installation of digital loggers 10 and logging workstations 104, the computer program executed by the CPU included in the CPU, ROM and RAM circuit 52 of the logging workstations 104 periodically transmits encrypted, compressed digital data recorded for telephone conversations via the LAN/WAN 98 to the digital logger 10 for recording by the optical-disk recorder 28. When recording only compressed digital data received from the logging workstations 104 onto archival optical-recording media, the digital logger 10 operates merely as a pre-mastering digital logger recorder 106. That is, under such operating conditions the digital logger 10 operates as a unit which is configured similarly to the digital logger 10 illustrated in FIG. 2 but which omits at least the input-channel jacks 44a–44d, the input-signal conditioner circuit 42 and the CODEC and FIFO circuit 48.

In addition to processing individual telephone conversations for pre-mastering and recording onto the archival optical-recording media using the optical-disk recorder 28, the digital logger 10 also permits an operator to monitor during recording telephone conversations received by one input-channel of the digital logger 10. To listen while recording a telephone conversation, an operator of the digital logger 10 uses the input-channel selector-switch 32 to select the input-channel of the digital logger 10. As indicated in FIG. 2, the CODEC and FIFO circuit 48 supplies analog signals generated by each of its CODECs to the input-channel selector-switch 32. The analog signal for the input-channel selected by the input-channel selector-switch 32 is then supplied to an input of an amplifier 112 included in the digital logger 10 concurrent with transfers by the computer program executed by the CPU of $\mu$Law compressed digital data from the CODEC and FIFO circuit 48 to the RAM of the CPU, ROM and RAM circuit 52. The digital logger 10 also includes a speaker 114 which receives an output signal from the amplifier 112 if a headphone plug is not inserted into the headphone jack 36. An electrical signal which the amplifier 112 receives from the replay volume-control 34 adjusts the gain of the amplifier 112 thereby permitting an operator to control the loudness of sound produced either by the speaker 114, or by the headphone plugged into the headphone jack 36.

Input-Signal Conditioner Circuit 42 and CODED and FIFO Circuit 48

The block diagram of FIG. 4 illustrates in greater detail the input-signal conditioner circuit 42x and the CODEC and FIFO circuit 44x for only one (1) of the four (4) identical input-channels which the input-signal conditioner circuit 42 and the CODEC and FIFO circuit 48 provide for the digital logger 10. In the typical input-signal conditioner circuit 42x illustrated in FIG. 5, the analog telephone signal, received by the typical input-channel jack 44x, is coupled to an input of a conventional line interface circuit 422. The line interface circuit 422 includes a high impedance transformer 4222 having a primary winding that connects in series with an automatic-reforming telecom-grade capacitor 4224 to two (2) signal lines of the input-channel jack 44x. One terminal of a secondary winding of the transformer 4222 connects to circuit ground while another terminal of that winding connects in series with a capacitor 4226. A network of limiting diodes 4228 connects between circuit ground and a junction between the secondary winding of the transformer 4222 and the capacitor 4226. The network of diodes 4228 protects circuitry on the secondary winding side of the transformer 4222 from electrical transients. Thus, the line interface circuit 422 provides electrical isolation between the analog telephone signal supplied to the digital logger 10 from a conventional telephone system (not depicted in any of the FIGS.) and the other circuits included in the digital logger 10. An output of the line interface circuit 422 from the capacitor 4226 supplies the analog telephone signal to an automatic level control circuit 424 also included in the input-signal conditioner circuit 42x.

Figure 5:
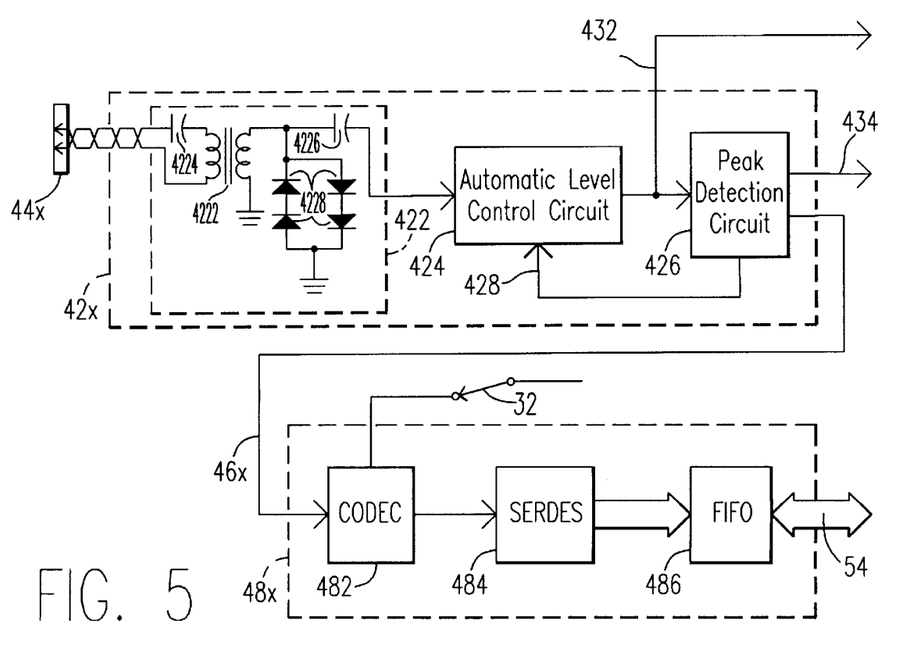
FIG. 5 is a block diagram depicting in greater detail one of four input-channels which an input-signal conditioner circuit and a CODEC and FIFO circuit, shown in the block diagram of FIG. 2, provide for digital logger illustrated there.

The automatic level control circuit 424 together with a peak detection circuit 426 provide the typical input-signal conditioner circuit 42x depicted in FIG. 5 with automatic gain control ("AGC"). As indicated in FIG. 5, an output of the automatic level control circuit 424 supplies the analog telephone signal to the peak detection circuit 426 which processes that signal to generate a gain control signal. The gain control signal, which an output of the peak detection circuit 426 transmits via a gain-control signal-line 428 back to a gain control input of the automatic level control circuit 424, maintains the output signal produced by the input-signal conditioner circuit 42 at a substantially constant strength. In addition to supplying the analog telephone signal to the peak detection circuit 426, the automatic level control circuit 424 also supplies that signal via lines in a VU Meter signal bus 432 to the VU meter 26. Both the automatic level control circuit 424 and peak detection circuit 426 are preferably provided by a model MC2830S microphone style automatic level control ("ALC") integrated circuit with built in voice activated switch ("VOX") manufactured by Motorola, Inc of Schaumburg, Ill.

The peak detection circuit 426 provides the analog telephone signal, as conditioned for conversion into compressed digital data by the input-signal conditioner circuit 42x, to an input of the typical CODEC and FIFO circuit 48x illustrated in FIG. 5 via a conditioned-analog-signal line 46x of the conditioned-analog-signal bus 46. Moreover, the peak detection circuit 426 also transmits a VOX signal as a digital "off-hook" signal via an off-hook signal line 434 to interrupt 12 of the CPU included in the CPU, ROM and RAM circuit 52. For reasons explained in greater detail below, the computer program processes the off-hook signal for starting and stopping recording whenever the digital logger 10 receives an analog signal via the input-channel jack 44x that is suitable for recording.

If the digital logger 10 receives a completely conventional analog telephone signal via the input-channel jack 44x, then the digital logger 10 could include a line interface circuit 422 which by itself could possesses a capability for providing signals that may be processed by the computer program executed by the CPU to determine the beginning and end of a telephone conversation as disclosed in U.S. Pat. No. 4,549,047. However, for certain telephone installations, particularly those at an emergency services hubs such as at a "911 center" or in an air traffic control facility, the digital logger 10 does not receive a completely conventional analog telephone signal. Rather, in many instances at emergency services hubs the input-channel jack 44x of the digital logger 10 receives a "dry" analog telephone signal which omits certain signals that are present in a completely conventional analog telephone signal. For example, such a dry analog telephone signal lacks the "ring" signal which is present in a completely conventional analog telephone signal. Emergency services hubs such as 911 centers receive the dry analog telephone signal so that after a telephone conversation begins the emergency center retains the ability to listen to the analog signal transmitted by the telephone which originated the call even if that telephone is physically hung up. Because the digital logger 10 must be capable of recording all communications received via either a conventional telephone line or via a dry telephone line, proper operation of the digital logger 10 cannot be controlled in all operating environments by signals generated by the line interface circuit 422.

To provide a signal via the off-hook signal line 434 to the computer program executed by the CPU, the preferred peak detection circuit 426 supplies the analog signal received from the automatic level control circuit 424 both to a band-pass filter, and to a band-notch filter included in the peak detection circuit 426. The pass band of the band-pass filter and the notch band of the band-notch filter overlap throughout the frequency range of speech, e.g. 500 Hz to 3,000 Hz. When the output signals from the two filters indicate that the analog signal which the peak detection circuit 426 receives from the automatic level control circuit 424 contains audio frequencies of sufficient strength, the peak detection circuit 426 supplies a signal to the computer program via the off-hook signal line 434 which indicates that condition.

Furthermore, in starting and stopping recording the computer program also filters the signal received from the peak detection circuit 426 via the off-hook signal line 434. Thus, before starting recording the signal which the CPU receives via the off-hook signal line 434 must indicate the presence of an audio signal continuously for some interval of time. If the digital logger 10 is receiving telephone communications, then the signal present on the off-hook signal line 434 must indicate the presence of an audio signal continuously for 0.5 seconds before recording commences. However, if the digital logger 10 is receiving air traffic control communications, then the signal present on the off-hook signal line 434 must indicate the presence of an audio signal continuously for only 0.1 seconds before recording commences. Analogously, once recording begins the signal which computer program receives via the off-hook signal line 434 must indicate an absence of an audio signal continuously for some interval of time before recording stops. If the digital logger 10 is recording a telephone communications, then the signal present on the off-hook signal line 434 indicating the absence of an audio signal continuously for 15.0 seconds terminates recording. However, if the digital logger 10 is recording air traffic control communications, then the signal present on the off-hook signal line 434 must indicate the absence of an audio signal continuously for only 0.2 seconds before recording terminates.

As described above, the peak detection circuit 426 of the input-signal conditioner circuit 42x provides the analog telephone signal to an input of a CODEC 482 included in the CODEC and FIFO circuit 48 for conversion into digital data. The CODEC 482 is preferably a quad telecom codec model AK2304 manufactured by AKM Semiconductor, Inc. of San Diego, Calif. which concurrently processes the analog signals received by each of the four (4) input-channels of the digital logger 10. In converting the received analog telephone signal into digital data, the CODEC 482 generates digital data representing the received analog signal at a data rate of 64 kilobits ("Kbits") per second per input-channel to which digital data, as described above, $\mu$Law compression is applied.

The $\mu$Law compressed digital data is transmitted as a serial bit stream from an output of the CODEC 482 to an input of a serializer/deserializer ("SERDES") 484. The SERDES 484 converts the serial bit stream into eight (8) bit data words that are transmitted in parallel to a FIFO 486. The FIFO 486 is preferably a model IDT 7206 manufactured by Integrated Device Technology, Inc. of Santa Clara, Calif.

Before the digital logger 10 begins recording a telephone conversation received by an input-channel, the FIFO 486 accumulates digitized data from the telephone conversation while the computer program receives the signal via the off-hook signal line 434 which indicates that the input-signal conditioner circuit 42x is receiving an audio signal. After the computer program decides to start recording a particular input-channel to the digital logger 10, it then begins retrieving the $\mu$Law compressed digital data from the FIFO 486 for that input-channel via the processor bus 54 and stores that compressed digital data into the RAM of the CPU, ROM and RAM circuit 52. Use of the FIFO 486 avoids loosing significant telephone communication such as caller ID location and telephone number identification which arrive before the telephone ring signal. While the digital logger 10 is concurrently recording telephone conversations for two or more input-channels the computer program executed by the CPU retrieves the $\mu$Law compressed digital data from the FIFOs 486 via the processor bus 54 rotating through the input-channels that are being recorded one input-channel after the other.

In addition to digitizing a received analog telephone signal, at appropriate times the CODEC 482 included in each of the conditioned-analog-signal bus 46x also converts $\mu$Law compressed digital data back into an analog signal. Thus, when an operator of the digital logger 10 replays a recorded telephone conversation, the computer program executed by the CPU transmits $\mu$Law compressed digital data back though the FIFO 486 and the SERDES 484 to the CODEC 482 for conversion into an analog signal. As described above, the CODEC 482 supplies the analog signal generated from the $\mu$Law compressed digital data to the input-channel selector-switch 32.

Operation of the Digital Logger 10

Figure 6:
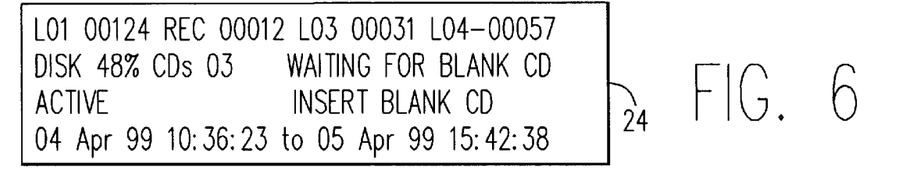
FIG. 6 shows a STATUS VIEW panel presented to an operator of the pre-mastering, archival optical recorder depicted in FIG. 1 on a liquid crystal display included therein.

Upon being turned on, the digital logger 10 first runs the POST operation stored in the ROM of the CPU, ROM and RAM circuit 52. After completing the POST operation, a properly operating digital logger 10 then displays its current status on the LCD 24 with a "STATUS VIEW" panel illustrated in FIG. 6. The upper line of text in the STATUS VIEW panel indicates the number of logged telephone conversations for each input-channel to the digital logger 10. The second line of text indicates the percentage of the hard disk 56 presently being used and how many CD-Rs would be required to record all logged telephone conversations onto that particular type of archival optical-recording media. The third line of text indicates whether the digital logger 10 is active. The fourth line of text indicates the start date and time of the oldest telephone conversation presently recorded on the hard disk 56 followed by the present date and time. During operation of the digital logger 10, additional status and prompt information may appear on the STATUS VIEW panel. Alarms can appear in a message display at the right hand end of the second line. If the digital logger 10 requires operator intervention, an operator prompt appears immediately below the message display, i.e. at the right hand end in the third line of the STATUS VIEW panel.

When first turned on the digital logger 10 is inactive and incoming telephone conversations are not logged. An operator of the digital logger 10 then activates the digital logger 10 for logging telephone conversations merely by pressing the start/stop button 16. If the digital logger 10 is merely turned on, after passage of a programmable idle time the digital logger 10 begins operating as though an operator pressed the start/stop button 16.

Figure 7:
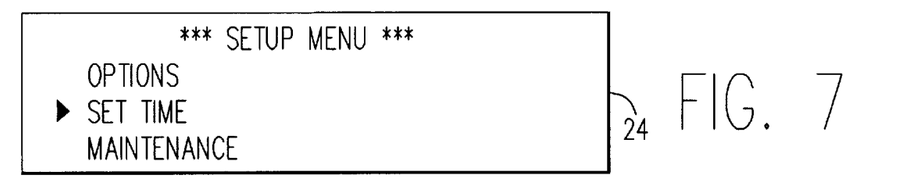
FIG. 7 shows a SETUP MENU panel presented to an operator of the pre-mastering, archival optical recorder depicted in FIG. 1 on the liquid crystal display included therein.

When the digital logger 10 is inactive such as immediately after it is turned on, or at any time when the digital logger 10 is not writing logged telephone conversations onto archival optical-recording media, an operator may by pressing an Enter/Exit Setup Menu button 22a manually display on or remove from the LCD 24 a "SETUP MENU" panel illustrated in FIG. 7. When the SETUP MENU panel appears on the LCD 24, the operator may then move through a list of various options of the digital logger 10 displayed on the LCD 24 using a Next Option button 22b and a Select Option button 22c. Pressing the Next Option button 22b moves a list of selection menu items upward past a "▶" symbol located in the third line of text appearing on the LCD 24. Pressing the Select Option button 22c selects the menu item that then appears immediately to the right of the "▶" symbol on the third line of text appearing on the LCD 24. A complete list of the menu items which can be displayed on the SETUP MENU panel appears below.

OPTIONS
SET TIME
MAINTENANCE
DISCWARE
ABOUT
GO BACK TO PREVIOUS MENU . . .

Displaying the SETUP MENU panel on the LCD 24 disables the start/stop button 16 and hot-burn button 18.

Figure 8:
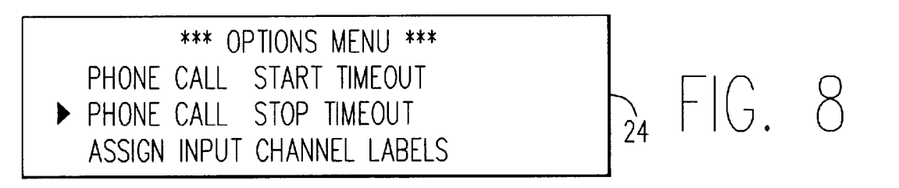
FIG. 8 shows a OPTIONS MENU panel presented to an operator of the pre-mastering, archival optical recorder depicted in FIG. 1 on the liquid crystal display included therein.

When an operator of the digital logger 10 displays the SETUP MENU panel on the LCD 24 by pressing the Enter/Exit Setup Menu button 22a and then using the Next Option button 22b and Select Option button 22c selects OPTIONS from the SETUP MENU panel's list of menu items as listed above, an "OPTIONS MENU" panel illustrated in FIG. 8 appears on the LCD 24. If the operator using the Next Option button 22b and Select Option button 22c then selects a SETUP CHANNEL MODE item from among the various OPTIONS MENU panel's list of menu items, one of three (3) alternative operating modes may be individually specified for each of the four (4) input-channels of the digital logger 10. The three (3) possible operating modes which the operator may specify for each of the four (4) input-channels are listed below.

OFF Disable the specified input-channel.
VOX The start/stop button 16 activates or deactivates the digital logger 10 so sound received by the specified input-channel starts and stops recording in accordance with programmable start and stop delays.
MAN Manual operation—the start/stop button 16 controls recording so the digital logger 10 records analog signals received by the specified input-channel continuously or not at all.

Accordingly, using the Next Option button 22b and the Select Option button 22c to navigate within the SETUP CHANNEL MODE panel displayed on the LCD 24, an operator may activate one or more input-channels of the digital logger 10 for automatically logging telephone conversations by specifying VOX as the operating mode for each such input-channel. In this way, using the SETUP CHANNEL MODE panel each individual input-channel of the digital logger 10 may be disabled, or may be programmed for recording either continuously or when that input-channel of the digital logger 10 receives a sufficiently strong analog signal. For those input-channels of the digital logger 10 programmed to record telephone conversations in either of the two preceding ways, after an operator uses the Next Option button 22b and the Select Option button 22c to return to the SETUP MENU panel and then exit the SETUP MENU panel by pressing the Enter/Exit Setup Menu button 22a, subsequently pressing the start/stop button 16 alternatively activates or deactivates recording by the digital logger 10. If while the digital logger 10 is logging telephone conversation an operator presses the start/stop button 16, the digital logger 10 stops logging telephone conversations and synchronizes a file system which manages the files recorded on the hard disk 56 by closing all the files into which the computer program had been storing compressed digital data.

As described previously, if archival optical-recording media is present in the optical-disk recorder 28 and the digital logger 10 completes accumulating approximately twenty-one (21) channel-hours of compressed digital data on the hard disk 56, the computer program may be enabled to automatically commence recording the most recently received data onto the recording media then present in the optical-disk recorder 28. Alternatively, an operator of the digital logger 10 may initiate the process of pre-mastering and recording compressed digital data by pressing the hot-burn button 18 at any time even if the digital logger 10 is inactive for logging telephone conversations. Under certain circumstances manually initiating the pre-mastering and recording process may be advantageous such as if logged telephone conversations are to be archived every day at a particular time. An operator of the digital logger 10 may at any time abort the mastering and recording process by concurrently pressing the hot-burn button 18 and Enter/Exit Setup Menu button 22a.

If an operator turns off power to the digital logger 10 using the on/off switch 14 while the digital logger 10 is logging telephone conversations, the computer program executed by the CPU first flushes to the hard disk 56 a cache memory located in the RAM that the computer program uses for optimizing performance of the digital logger 10, and then shuts down the digital logger 10. Similarly, if the digital logger 10 is initializing or updating the file system when an operator turn off the on/off switch 14 computer program executed by the CPU completes those operations before shutting down the digital logger 10.

In most environments, operation of the digital logger 10 as described thus far provides all the functions which an operator usually needs. However, the digital logger 10 provides additional set-up options outlined below which an operator will usually use only during or immediately after installing the digital logger 10.

Figure 9:
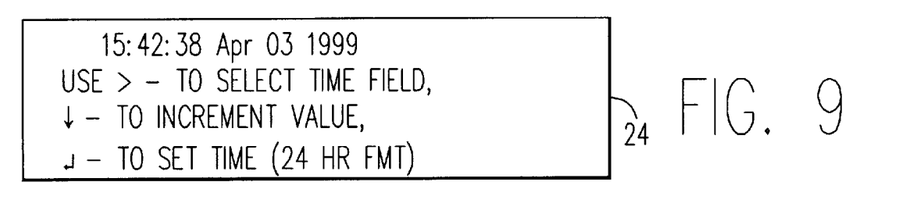
FIG. 9 shows a SET TIME panel presented to an operator of the pre-mastering, archival optical recorder depicted in FIG. 1 on the liquid crystal display included therein.

From the SETUP MENU panel an operator of the digital logger 10 may select the SET TIME item which causes a SET TIME panel illustrated in FIG. 9 to appear on the LCD 24. The SET TIME menu item allows an operator of the digital logger 10 to set the current time and date maintained by a clock IC included in the digital logger 10. If a battery included in the digital logger 10 that energizes the operation of the clock IC fails, this option appears on the LCD 24 automatically when the digital logger 10 is turned on. After the SET TIME panel appears on the LCD 24, the operator sets the current time using the Next Option button 22b and the Enter/Exit Setup Menu button 22a. Pressing the Enter/Exit Setup Menu button 22a moves a cursor displayed on the LCD 24 through fields of the time and date one digit after the other for selecting the field to be changed. Pressing the Next Option button 22b increases the value of the selected digit. Pressing the Select Option button 22c records the time and data into the clock IC and restores the SETUP MENU panel display to the LCD 24.

As described previously, from the SETUP MENU panel an operator of the digital logger 10 may select the OPTIONS MENU item which causes the OPTIONS MENU panel illustrated in FIG. 9 to appear on the LCD 24. An operator of the digital logger 10 uses the OPTIONS MENU panel to program parameters that affect the operation of the digital logger 10. The digital logger 10 is pre-programmed with default value for these parameters which provide proper operation for the digital logger 10 in most circumstances. Unusual operating conditions may require changing some of these parameters.

Similar to the SETUP MENU panel, pressing the Next Option button 22b while the OPTIONS MENU panel appears on the LCD 24 moves a list of selection menu items upward past a "▸" symbol located in the third line of text appearing on the LCD 24. Pressing the Select Option button 22c selects the menu item that then appears immediately to the right of the "▸" symbol on the third line of text appearing on the LCD 24. A complete list of the menu items which can be displayed on the OPTIONS MENU panel appears below.

PHONE CALL START TIMEOUT
    PHONE CALL STOP TIMEOUT
    ASSIGN INPUT CHANNEL LABELS
    SETUP CHANNEL MODE
    SET CD-R WRITE SPEED
    AUTO EJECT
    LOGGING AUTOSTART TIMEOUT
    SOUND ENABLED
    COMPRESSION LEVEL TRIGGER
    SET IP ADDRESS
    ERASE OLD CALLS IF DISK 90% FULL
    RESTORE LOGGER TO DEFAULT SETTINGS
    GO BACK TO PREVIOUS MENU . . .

An operator selects the PHONE CALL START TIMEOUT menu item to change the interval during which the off-hook signal must be present on the off-hook signal line 434 before the computer program executed by the CPU begins recording a telephone conversation. The interval should normally be left at its default value, around 0.5 seconds for recording telephone conversations.

An operator selects the PHONE CALL STOP TIMEOUT menu item to change the interval during which the off-hook signal must be absent before the computer program executed by the CPU terminates recording a telephone conversation. It should normally be left at its default value, around 15 seconds for recording telephone conversations. Increasing the duration of the PHONE CALL STOP TIMEOUT parameter keeps telephone conversations from spanning two or more files. This parameter should be changed only if an operator observes that telephone conversations are being recorded in more than one (1) file. If the duration is too long then a possibility exists that two telephone conversations could be recorded in a single file.

If a facility includes more than one digital logger 10, it is advantageous to uniquely identify each of the four (4) input-channels for each digital logger 10 when recording archival optical-recording media. An operator of the digital logger 10 by selecting the ASSIGN INPUT CHANNEL LABELS menu item may assign any arbitrarily chosen two (2) digit channel number to the name of the highest level of the directory tree structure illustrated above in TABLE I used in recording on archival optical-recording media. Using this capability of assigning a unique two (2) digit channel number for recordings from each input-channel of every digital logger 10 in a facility that includes two or more digital loggers 10 alleviates ambiguity and confusion in retrieving and replaying specific telephone conversations.

An operator of the digital logger 10 changes the SET CD-R WRITE SPEED menu item to vary the speed at which the optical-disk recorder 28 records compressed digital data onto archival optical-recording media. The SET CD-R WRITE SPEED panel permits selecting among writing speeds such as 1×, 2× or 4× provided by the optical-disk recorder 28.

An operator of the digital logger 10 changes the AUTO EJECT menu item to activate or deactivate automatic ejecting the archival optical-recording media after it has been recorded. Disabling the AUTO EJECT option causes the digital logger 10 to keep the archival optical-recording media within the optical-disk recorder 28 until the operator ejects it manually.

An operator of the digital logger 10 changes the LOGGING AUTOSTART TIMEOUT menu item to vary the interval that elapses after turning the digital logger 10 on before recording of telephone conversations begins automatically. To disable automatic activation of the digital logger 10 an operator assigns to LOGGING AUTO START TIMEOUT a value of zero (0).

An operator of the digital logger 10 may change the SOUND ENABLED menu item to prevent the digital logger 10 from generating audible alarms thereby possibly alleviating operator annoyance.

An operator of the digital logger 10 changes the COMPRESSION LEVEL TRIGGER menu item to vary the percentage of the hard disk 56 that must be used before the computer program executed by the CPU starts either of the background computer programs for further compressing the digital data stored on the hard disk 56. This threshold is set to 80% under most circumstances. Further compressing the digital data increases the recording time for a 21 GB hard disk 56 from approximately one-thousand six-hundred (1,600) input-channel-hours to approximately six-thousand five-hundred (6,500) input-channel-hours. An operator of the digital logger 10 can disable further compression of the digital data by setting the value of the COMPRESSION LEVEL TRIGGER to zero (0).

An operator of the digital logger 10 uses SET IP ADDRESS menu item to assign a TCP/IP address to the digital logger 10 that a web server function provided by real-time operating system executed by the CPU needs to communicate via the LAN/WAN 98 with workstations 102 and/or logging workstations 104.

An operator of the digital logger 10 sets ERASE OLD CALLS IF DISK 90% FULL menu item to enable erasing the oldest telephone conversations if the hard disk 56 becomes 90% full. The default setting is to disable erasing the oldest telephone conversations. If the oldest telephone conversations are not erased, operation of the digital logger 10 halts when the hard disk 56 becomes full.

An operator of the digital logger 10 selects the RESTORE LOGGER TO DEFAULT SETTINGS menu item to restore the default values for all operating parameters.

The digital logger 10 may also include as an option an ability to replay recorded telephone conversations using the CODEC and FIFO circuit 48, input-channel selector-switch 32, amplifier 112, replay volume-control 34, speaker 114, and the headphone jack 36. If the digital logger 10 lacks that optional feature, then replaying a recorded telephone conversation is usually performed using any suitably equipped personal computer either by replaying a recording thereof from archival optical-recording media, or by retrieving a file that contains the telephone conversation from the digital logger 10 using the LAN/WAN 98. However, the digital logger 10 may also be equipped for replaying recorded telephone conversations. To permit replaying telephone conversations on the digital logger 10, in addition to the CODEC 482, SERDES 484 and FIFO 486, each CODEC and FIFO circuit 48x must also include a second FIFO and SERDES via which the computer program executed by the CPU transmits $\mu$Law compressed digital data back to the CODEC 482. In replaying a recorded telephone conversation, the computer program executed by the CPU decompresses the specified telephone conversation from the format in which it is recorded on the hard disk 56 to obtain flaw compressed digital data, and transmits the $\mu$Law compressed digital data to the CODEC for the specified input-channel. The CODEC then decodes the μLaw compressed digital data to produce the analog signal supplied to the input-channel selector-switch 32.

If the hardware of the digital logger 10 is equipped to permit replaying recorded telephone conversations as described in the preceding paragraph, then a PLAYBACK AUDIO menu item augments the preceding list of menu items for OPTIONS MENU panel. The PLAYBACK AUDIO menu item together with a sequence of sub-menus thereof permits an operator to select for replaying a specific, previously-recorded telephone conversation. When an operator of a suitably equipped digital logger 10 selects the PLAYBACK AUDIO menu item a first sub-menu appears which permits the operator to first specify an input-channel for which a previously-recorded telephone conversation will be replayed. After an operator using the first sub-menu selects one (1) of the four (4) input-channels, a second sub-menu appears which permits the operator to then specify a date for which a previously-recorded telephone conversation will be replayed. After an operator using the second sub-menu selects a date, a third sub-menu appears which permits the operator to then select for replaying a telephone conversation recorded at a particular time.

When the OPTIONS MENU panel appears on the LCD 24, selection of the GO BACK TO PREVIOUS MENU menu item by an operator of the digital logger 10 returns from the OPTIONS MENU panel to the SETUP MENU panel.

Figure 10:
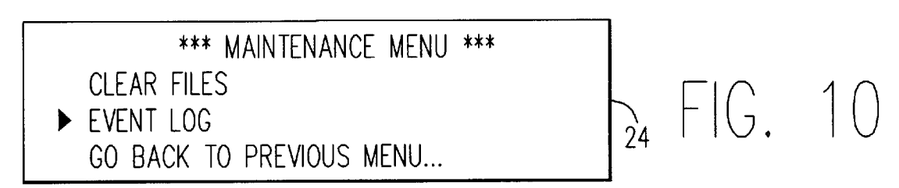
FIG. 10 shows a MAINTENANCE MENU panel presented to an operator of the pre-mastering, archival optical recorder depicted in FIG. 1 on the liquid crystal display included therein.

From the SETUP MENU panel an operator of the digital logger 10 may select the MAINTENANCE MENU item which causes a MAINTENANCE MENU panel illustrated in FIG. 10 to appear on the LCD 24. An operator of the digital logger 10 uses the MAINTENANCE MENU panel to perform important housekeeping chores or to do certain operations which may affect the logger status. A complete list of the menu items which appear on the MAINTENANCE MENU panel appears below.

CLEAR FILES
EVENT LOG
GO BACK TO PREVIOUS MENU . . .

An operator of the digital logger 10 selects the CLEAR FILES menu item to initialize the file system thereby erasing all files for previously recorded telephone conversations. An operator of the digital logger 10 may be compelled to select the CLEAR FILES menu item if an electrical power failure causes the file system to become corrupted.

Figure 11:
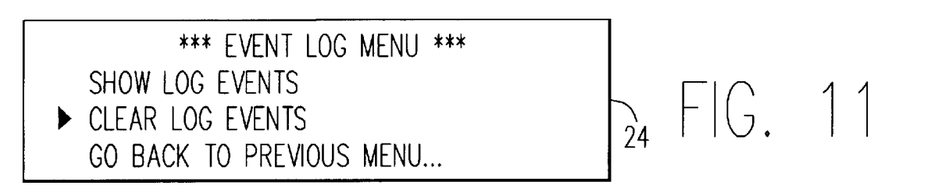
FIG. 11 shows an EVENT LOG MENU panel presented to an operator of the pre-mastering, archival optical recorder depicted in FIG. 1 on the liquid crystal display included therein.

An operator of the digital logger 10 selects the EVENT LOG menu item to display an EVENT LOG panel on the LCD 24 that is completely illustrated in FIG. 11. The EVENT LOG panel permits an operator either to display or to clear a log of system events by respectively selecting either SHOW LOG EVENTS menu item or a CLEAR LOG EVENTS menu item.

When the EVENT LOG MENU panel appears on the LCD 24, selection of the GO BACK TO PREVIOUS MENU menu item by an operator of the digital logger 10 returns from the EVENT LOG MENU panel to the MAINTENANCE MENU panel.

When the MAINTENANCE MENU panel appears on the LCD 24, selection of the GO BACK TO PREVIOUS MENU menu item by an operator of the digital logger 10 returns from the MAINTENANCE MENU panel to the SETUP MENU panel.

Figure 12:
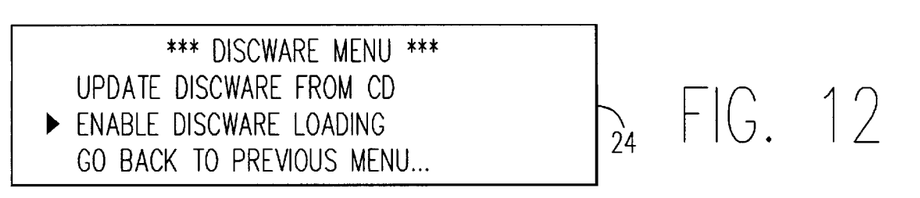
FIG. 12 shows an DISCWARE MENU panel presented to an operator of the pre-mastering, archival optical recorder depicted in FIG. 1 on the liquid crystal display included therein.

From the SETUP MENU panel an operator of the digital logger 10 may select the DISCWARE MENU item which causes a DISCWARE MENU panel illustrated in FIG. 12 to appear on the LCD 24. An operator of the digital logger 10 uses the DISCWARE MENU panel to maintain and install all of the computer programs stored on the hard disk 56 that are executed by the CPU for recording telephone conversations. A complete list of the menu items which appear on the DISCWARE MENU panel appears below.

UPDATE DISCWARE FROM CD
ENABLE DISCWARE LOADING
ABOUT
GO BACK TO PREVIOUS MENU . . .

An operator of the digital logger 10 selects the UPDATE DISCWARE FROM CD menu item to read an updated computer program from a CD-ROM present in the optical-disk recorder 28 and to store that computer program onto the hard disk 56 for execution by the CPU.

An operator of the digital logger 10 selects the ENABLE DISCWARE LOADING menu item to enable or disable the CPU from executing the computer program presently stored on the hard disk 56. Disabling execution of the computer program causes the digital logger 10 to automatically read a replacement computer program from a CD-ROM present in the optical-disk recorder 28 the next time an operator turns the digital logger 10 on. An operator of the digital logger 10 may be compelled to select the ENABLE DISCWARE LOADING menu item if an electrical power failure or some other catastrophe causes the computer program stored on the hard disk 56 to become corrupted.

An operator of the digital logger 10 selects the ABOUT menu item to display information about the revision of the computer program executed by the CPU and the type of optical-disk recorder 28 installed in the digital logger 10. This information is needed if an operator needs technical support for the digital logger 10.

When the DISCWARE MENU panel appears on the LCD 24, selection of the GO BACK TO PREVIOUS MENU menu item by an operator of the digital logger 10 returns from the DISCWARE MENU panel to the SETUP MENU panel.

When the SETUP MENU panel appears on the LCD 24, selection of the GO BACK TO PREVIOUS MENU menu item by an operator of the digital logger 10 returns from the SETUP MENU panel to the STATUS VIEW panel.

For the digital logger 10 illustrated in FIGS. 1, 2 and 5 as described thus far, the preferred real-time operating system is μC/OS RTOS written by Jean Labrosse and published by R&D Publications, Inc. In addition to the μC/OS RTOS, the operating system software for the digital logger 10 also includes a PC/DOS 20 compatible real-time file system called RTFS which EBS, Inc. of Groton, Mass. licenses. While this combination of software permits restricting access to files that contain recorded telephone conversations which are stored on the hard disk 56 to a workstation 102 or a logging workstation 104 that submits the proper password assigned to each file, the combination of software does not provide encryption for the file during transmission via the LAN/WAN 98.

An alternative embodiment of the present invention differs from the digital logger 10 illustrated in FIGS. 1, 2 and 5 as described thus far by providing twenty-four (24) input-channels for receiving telephone conversations. This twenty-four (24) input-channel digital logger uses a conventional PC compatible mother board that includes a Pentium III microprocessor. In this alternative embodiment of the present invention, the CODEC and FIFO circuit 48 is packaged on a printed circuit board card that plugs into a PCI Bus slot of the PC compatible mother board. However, because a twenty-four (24) input-channel input-signal conditioner circuit 42 requires a comparatively large number of identical circuits, that portion of the alternative embodiment digital logger is packaged on a separate printed circuit board which a ribbon cable connects to the PCI Bus CODEC and FIFO circuit 48.

This alternative embodiment digital logger preferably runs Microsoft Corporation's Real-Time NT operating system which includes password protection for remote file access, software for communicating via the LAN/WAN 98, and encryption of files that contains a particular recorded telephone conversations during transmission via the LAN/WAN 98. Thus, in addition to providing six (6) times as many input-channels, the alternative embodiment digital logger can also prevent unauthorized replaying of the telephone conversation even if during transmission between a digital logger 10 or a digital logger recorder 106 and a remote workstation 102 or logging workstation 104 the transmission were intercepted by a party who is not authorized to access the telephone conversation.

Although the present invention has been described in terms of the presently preferred embodiment, it is to be understood that such disclosure is purely illustrative and is not to be interpreted as limiting. For example, while the digital logger 10 has been described in a particular embodiment specifically adapted for logging telephone conversations such as telephone calls, it may also be advantageously used for archival recording of other analog data such as that received from sensors distributed throughout an industrial plant or refinery. While as described above the digital logger 10 employs μLaw, ADPCM and G.723 compression in recording telephone conversations, other compression techniques could be advantageously applied to compress the digitized analog input signal such as G.728 and a Moving Picture Experts Group audio compression technique identified by the name MP-3. While the digital logger 10 as described above uses the hard disk 56 as a buffer during recording of compressed digital data, a large RAM could be advantageously employed for that same purpose. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A pre-mastering, optical recorder comprising:

an input-signal conditioning-circuit for electronically conditioning an analog signal received by an input-channel of the pre-mastering, optical recorder thereby producing a conditioned analog signal adapted for conversion into digital data;

a coder and decoder ("CODEC") that is coupled to said input-signal conditioning-circuit for receiving the conditioned analog signal from said input-signal conditioning-circuit and for converting the conditioned analog signal into digital data;

a random access memory ("RAM") that is coupled to said CODEC for receiving and temporarily storing digital data produced by said CODEC;

a buffer for receiving from said RAM and semi-permanently storing digital data;

an optical-disk recorder that is coupled to said RAM and that is adapted for recording pre-mastered digital data onto optical recording media; and a central processing unit ("CPU") that is coupled to said CODEC, said RAM, said buffer, and said optical-disk recorder, said CPU executing a digital computer program that:

supervises operation of the pre-mastering, optical recorder for transferring from said CODEC to said RAM digital data produced by said CODEC responsive to the presence of the analog signal on the input-channel of the pre-mastering, optical recorder, and for subsequently transferring the digital data from said RAM to said buffer for semi-permanently recording the digital data therein;

periodically retrieves from said buffer digital data that has been semi-permanently recorded therein, processes the retrieved digital data to prepare pre-mastered digital data in a format that permits recording at least twenty (20) input-channel-hours of the analog signal received by said input-signal conditioning-circuit onto optical recording media; and transfers to said optical-disk recorder the pre-mastered digital data for recording the pre-mastered digital data onto optical recording media then present in said optical-disk recorder.

2. The pre-mastering, optical recorder of claim 1 wherein a large RAM provides said buffer for receiving from said RAM and semi-permanently recording digital data.

3. The pre-mastering, optical recorder of claim 1 wherein a read-write direct access storage device that is coupled to said RAM provides said buffer for receiving from said RAM and semi-permanently recording digital data.

4. The pre-mastering, optical recorder of claim 3 wherein said read-write direct access storage device receives digital data for storage therein via a first bus, and said optical-disk recorder receives digital data for recording onto optical recording media via a second bus which is separate from the first bus.

5. The pre-mastering, optical recorder of claim 1 wherein the digital computer program executed by said CPU concurrently stores in said buffer digital data recorded from at least two input-channels and in preparing the pre-mastered digital data for recording onto optical recording media categorizes the stored digital data by input-channel.

6. The pre-mastering, optical recorder of claim 5 wherein the digital computer program executed by said CPU assigns an operator-specified name to each category of digital data recorded onto optical recording media for each input-channel.

7. The pre-mastering, optical recorder of claim 5 wherein the digital computer program executed by said CPU when preparing the pre-mastered digital data further categorizes the digital data for each input-channel by date of recording.

8. The pre-mastering, optical recorder of claim 7 wherein the digital computer program executed by said CPU when preparing the pre-mastered digital data further categorizes the digital data for each date of recording by time of recording.

9. The pre-mastering, optical recorder of claim 1 wherein said input-signal conditioning-circuit includes an automatic gain control ("AGC") that maintains the conditioned analog signal at a substantially constant strength.

10. The pre-mastering, optical recorder of claim 1 wherein said input-signal conditioning-circuit includes a voice activated switch ("VOX") that responds to strength of the analog signal received by said input-signal conditioning-circuit for transmitting a signal to said CPU which said CPU processes for starting and stopping transfers of digital data from said CODEC to said RAM.

11. The pre-mastering, optical recorder of claim 1 wherein said input-signal conditioning-circuit provides at least two input-channels for receiving analog signals, and the pre-mastering, optical recorder further comprises an input-channel selector-switch for selecting the analog signal received by one input-channel for monitoring concurrent with transfers of digital data from said CODEC to said RAM.

12. The pre-mastering, optical recorder of claim 1 further comprising a network interface circuit that is coupled to said RAM and which interfaces the pre-mastering, optical recorder with a network thus permitting the pre-mastering, optical recorder to communicate electronically with workstations that are also coupled to the network, the digital computer program executed by said CPU also being adapted for transferring digital data via the network interface circuit from said buffer to a workstation coupled to said network.

13. The pre-mastering, optical recorder of claim 12 wherein the pre-mastering, optical recorder transmits digital data to a workstation only after receiving a password from the workstation that authorizes access to the digital data.

14. The pre-mastering, optical recorder of claim 12 wherein the pre-mastering, optical recorder transmits encrypted digital data to a workstation that is coupled to said network.

15. The pre-mastering, optical recorder of claim 1 wherein the digital computer program executed by said CPU periodically retrieves from said buffer digital data that has been semi-permanently recorded therein, processes the retrieved digital data to prepare compressed digital data therefrom to be recorded to said buffer to replace the retrieved digital data.

16. A logging workstation that is adapted for inclusion in a network that includes a digital logger recorder, the logging workstation comprising:

an input-signal conditioning-circuit for electronically conditioning an analog signal received by an input-channel of the logging workstation thereby producing a conditioned analog signal adapted for conversion into digital data;

a CODEC that is coupled to said input-signal conditioning-circuit for receiving the conditioned analog signal from said input-signal conditioning-circuit and for converting the conditioned analog signal into digital data;

a RAM that is coupled to said CODEC for receiving and temporarily storing digital data produced by said CODEC;

a buffer for receiving from said RAM and semi-permanently storing digital data;

a network interface circuit that is coupled to said RAM and which interfaces the logging workstation with a network thus permitting the logging workstation to communicate electronically with other workstations and with a digital logger recorder that are also coupled to the network; and a CPU that is coupled to said CODEC, said RAM, said buffer, and said network interface circuit, said CPU executing a digital computer program that:

supervises operation of the logging workstation for transferring from said CODEC to said RAM digital data produced by said CODEC responsive to the presence of the analog signal on the input-channel of the logging workstation, and for subsequently transferring the digital data from said RAM to said buffer for semi-permanently recording the digital data therein;

periodically retrieves from said buffer digital data that has been semi-permanently recorded therein, processes the retrieved digital data to prepare compressed digital data therefrom to be recorded to said buffer to replace the retrieved digital data; and periodically transmits digital data via the network interface circuit from said buffer to the network for receipt by a digital logger recorder that is also coupled to said network.

17. The logging workstation of claim 16 wherein the logging workstation transmits encrypted digital data to a digital logger recorder that is coupled to said network.

18. The logging workstation of claim 16 wherein a large RAM provides said buffer for receiving from said RAM and semi-permanently recording digital data.

19. The logging workstation of claim 16 wherein read-write direct access storage device that is coupled to said RAM provides said buffer for receiving from said RAM and semi-permanently recording digital data.

20. The logging workstation of claim 16 wherein said input-signal conditioning-circuit includes an AGC that maintains the conditioned analog signal at a substantially constant strength.

21. The logging workstation of claim 16 wherein said input-signal conditioning-circuit includes a VOX that responds to strength of the analog signal received by said input-signal conditioning-circuit for transmitting a signal to said CPU which said CPU processes for starting and stopping transfers of digital data from said CODEC to said RAM.

22. The logging workstation of claim 16 wherein said input-signal conditioning-circuit provides at least two input-channels for receiving analog signals, and the logging workstation further comprises an input-channel selector-switch for selecting the analog signal received by one input-channel for monitoring concurrent with transfers of digital data from said CODEC to said RAM.

* * * * *